June 28, 1932.　　　　A. WELIKES　　　　1,865,291
STEERING GEAR BRACE
Filed May 12, 1930
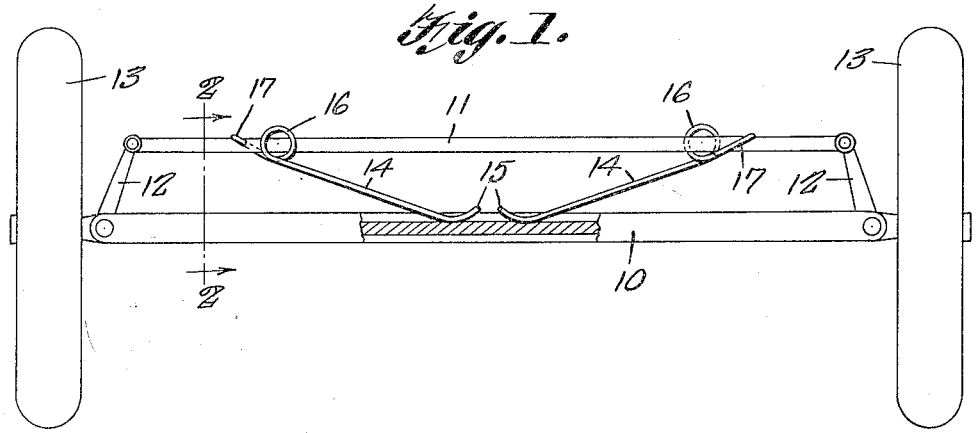
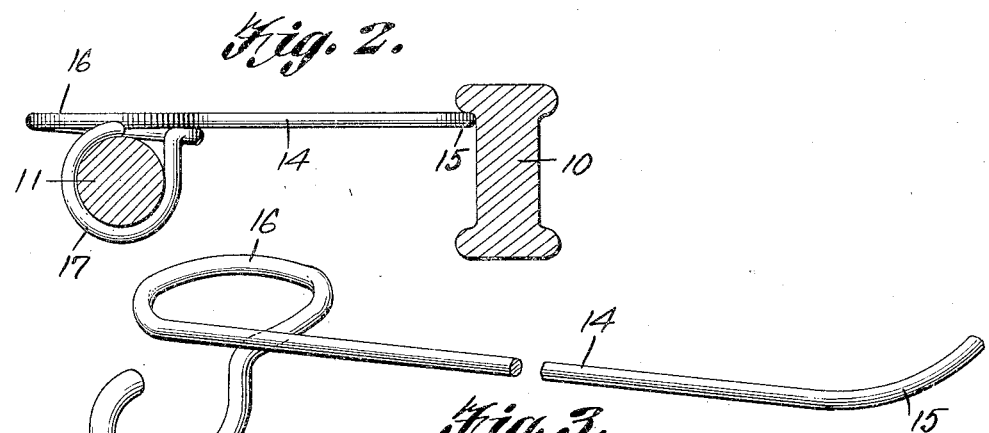
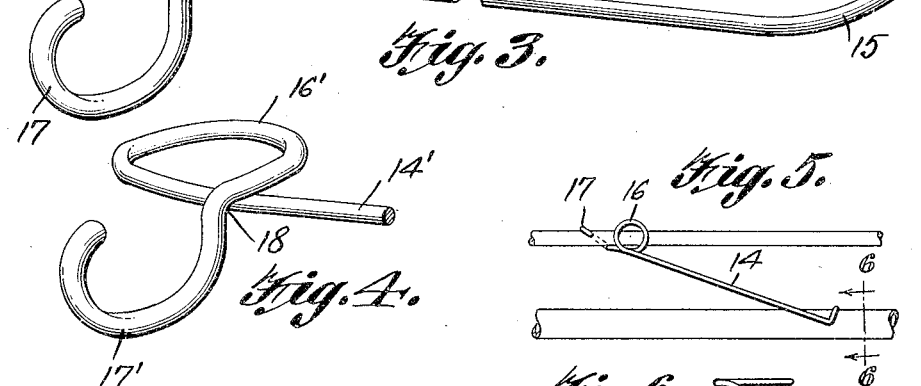
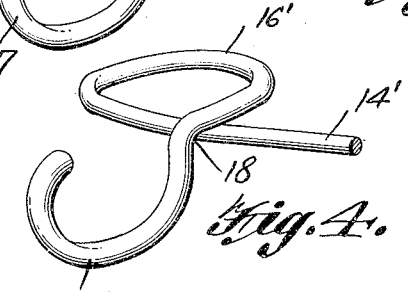
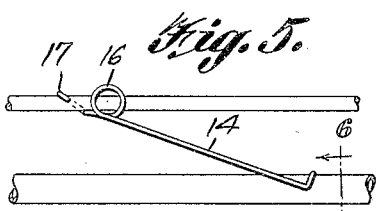
Anthony Welikes,
INVENTOR
BY Victor J. Evans
ATTORNEY
WITNESS:

Patented June 28, 1932

1,865,291

UNITED STATES PATENT OFFICE

ANTHONY WELIKES, OF ROCHESTER, NEW YORK

STEERING GEAR BRACE

Application filed May 12, 1930. Serial No. 451,758.

This invention relates to braces of a type and design primarily applicable upon the steering mechanisms of vehicles to obviate wobbling and shimmying of the steering wheels.

One of the principal objects of the invention consists of clamping means for the brace to accommodate and grippingly engage the tie rod of a steering gear.

Another object of the invention embodies the arrangement of a spring loop upon the brace to tension the other end of same against the adjacent surface of the vehicle axle.

More specifically stated the brace construction is such that the relative arrangement of the axle engaging portion and spring loop may be arranged to exercise full or predetermined tension, in accordance with the degree of wheel looseness and tightness of the steering wheel.

With the above and other objects in view, the invention further consists of the following novel features and details of construction, to be hereinafter more fully described, illustrated in the accompanying drawing and pointed out in the appended claim.

In the drawing:

Figure 1 is a top plan view of a motor vehicle axle, wheels and tie rod partly broken away to illustrate the arrangement of the invention thereon to take up any looseness occurring at the connections therefor and to obviate the transmission of road shock, wheel shimmy and other disturbances upwardly through the steering column to the steering wheel.

Figure 2 is a sectional view taken on line 2—2 of Figure 1.

Figure 3 is a perspective view of the invention.

Figure 4 is a fragmentary perspective view similar to Figure 3 of a modified form of the invention.

Figure 5 is a fragmentary top plan view of a modified form of my invention as applied for use upon an axle of the round type.

Figure 6 is a sectional view taken on line 6—6 of Figure 5.

Referring to the drawing in detail wherein like characters of reference denote corresponding parts, the reference character 10 indicates generally the axle of a vehicle steering mechanism, 11 the connecting rod, 12 the spindle arms and 13 the steering wheels. All of the above being of the usual and well known construction conforms no part of the present application for Letters-Patent but is mentioned merely for purposes of illustration in bringing forward the novel advantages of the present invention and cooperatively associated therewith.

The invention primarily resides in the provision and arrangement of a rod member 14, preferably constructed of spring steel and having one end curved, as at 15, for wiping contact with the inner side or surface of an axle. A spring loop 16 formed adjacent the opposite end of the rod 14 is in communication with an open loop 17 designed to accommodate and grippingly engage the tie rod 11 in the manner shown in Figures 1 and 2. By reason of the fact that the open loops 17 are disposed at right angles to the spring loops 16 and beneath the rods 14 proper, it is to be noted that the rods 14 will be permitted to exercise the full tension of the spring loops 16 against the inner side of the vehicle axle whereas the braces themselves will travel in unison with the tie rod 11 during the oscillatory motions thereof.

The modified form of my invention shown in Figure 4 of the drawing embodies the essential characteristics of the preferred form with the exception that that portion of the spring loop 16' having communication with the open loop 17' is disposed in a plane slightly above and reposing upon the rod 14' proper. An offset 18 is provided at this juncture to obviate undue flexing of the bar or rod 14'. It is contended that the modification should be applied upon the steering mechanisms of vehicles having developed but slightly perceptible looseness at the respective journal connections whereby the steering for the particular vehicle will not work an undue hardship on the part of the vehicle driver in the manipulation of the steering mechanism.

The modification shown in Figures 5 and 6 of the drawing may be constructed after either of the previous forms of my invention shown in Figures 3 and 4 of the drawing save for the formation of that portion of the brace having wiping contacting engagement with the axle. This particular end is curved in the formation of a semi-circle to effectively engage axles of the round type. The semi-circular shaped ends of the braces are disposed at right angles to the rods proper. In the application of all forms of the invention, it is to be noted that no tools of any description are necessary to facilitate application and adjustment of same upon the various forms of vehicle steering mechanisms.

The invention is susceptible of various changes in its form, proportions and minor details of construction, and the right is herein reserved to make such changes as properly fall within the scope of the appended claim.

Having described the invention, what is claimed is:

A steering gear stabilizer consisting of a single length of spring rod having a loop bent therein and a hook bent therein directly at the side of the loop, said loop and hook lying in planes at a right angle and said loop and hook adapted to completely surround the tie rod of the steering gear.

In testimony whereof I affix my signature.

ANTHONY WELIKES.